United States Patent
Larsson

(10) Patent No.: US 8,971,201 B2
(45) Date of Patent: Mar. 3, 2015

(54) PLANNING ALLOCATION OF TIME-FREQUENCY RESOURCES IN WIRELESS OFDMA COMMUNICATION SYSTEMS

(75) Inventor: Peter Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 143 days.

(21) Appl. No.: 13/695,306

(22) PCT Filed: May 4, 2010

(86) PCT No.: PCT/SE2010/050488
§ 371 (c)(1),
(2), (4) Date: Oct. 30, 2012

(87) PCT Pub. No.: WO2011/139190
PCT Pub. Date: Nov. 10, 2011

(65) Prior Publication Data
US 2013/0051273 A1    Feb. 28, 2013

(51) Int. Cl.
*H04J 3/14* (2006.01)
*H04L 1/00* (2006.01)
*H04L 5/00* (2006.01)

(52) U.S. Cl.
CPC ............ *H04L 1/0019* (2013.01); *H04L 5/0007* (2013.01); *H04L 5/006* (2013.01); *H04L 1/0002* (2013.01)
USPC ......................................... 370/252; 455/41.2

(58) Field of Classification Search
CPC .............................. H04L 5/006; H04L 5/0007
USPC ......................................... 370/252; 455/41.2
See application file for complete search history.

(56) References Cited

U.S. PATENT DOCUMENTS

| 6,400,773 B1 | 6/2002 | Krongold et al. |
| 2007/0184853 A1 | 8/2007 | Hottinen et al. |

(Continued)

OTHER PUBLICATIONS

Lin, et al. Optimal and Near-Optimal Resource Allocation Algorithms for OFDMA Networks. IEEE Transactions on Wireless Communications. vol. 8 No. 8. Aug. 1, 2009.

(Continued)

*Primary Examiner* — Thai Hoang
*Assistant Examiner* — Matthew Hopkins

(57) ABSTRACT

A time-frequency resource allocation planner for planning allocation of time-frequency resources to sustain communication links from a common transmitter (TX) to multiple receivers ($RX_1, \ldots, RX_K$) in a wireless OFDMA communication system includes a resource block selector configured to select a set (RBS) of time-frequency resource blocks (RB) for transmission of one packet for each communication link. A communication link quality measure provider is configured to determine a gain-to-interference-plus-noise ratio measure ($G_k$) for each communication link. A transmit power and transmit rate estimator, connected to the resource block selector and the communication link quality measure provider, is configured to jointly estimate, within the selected set of time-frequency resource blocks, transmit power ($P_k$) and transmit rate ($R_k$) of the packets as functions of determined gain-to-interference-plus-noise ratio measures, to at least approximately minimize expected transmitter energy consumption.

8 Claims, 9 Drawing Sheets

---

SET INITIAL TRANSMIT POWER ESTIMATES AND INITIAL TRANSMIT RATE ESTIMATES OF THE PACKETS TO $$P_k^* = \frac{\ln(2)}{\sqrt{G_k}TB} \sum_{j=1}^{K} \frac{L_j}{\sqrt{G_j}}, \quad k=1,\ldots,K$$

$$R_k^* = \frac{\sqrt{G_k}}{TB} \sum_{j=1}^{K} \frac{L_j}{\sqrt{G_j}}, \quad k=1,\ldots,K$$

— S4

ROUND THE INITIAL ESTIMATES TO NEAREST PERMISSIBLE VALUES, WHERE NECESSARY

— S5

(56) References Cited

U.S. PATENT DOCUMENTS

| | | | |
|---|---|---|---|
| 2007/0248048 A1* | 10/2007 | Zhu et al. | 370/329 |
| 2008/0026782 A1 | 1/2008 | Kwon et al. | |
| 2008/0039129 A1 | 2/2008 | Li et al. | |
| 2009/0061774 A1* | 3/2009 | Larsson et al. | 455/41.2 |
| 2009/0186648 A1 | 7/2009 | Larsson | |
| 2010/0041409 A1 | 2/2010 | Kim et al. | |

OTHER PUBLICATIONS

Moretti, M et al. A Resource Allocator for the Uplink of Multi-Cell OFDMA Systems. IEEE Transactions on Wireless Communications. vol. 6 No. 8, Aug. 1, 2007.

Abrardo, et al. Optimum Channel Allocation in OFDMA Multi-Cell Systems. Network Control and Optimization. Sep. 8, 2008.

Abrardo, et al. Radio Resource Allocation Problems for OFDMA Cellular Systems. Computers and Operation Research. vol. 36 No. 5, May 1, 2009.

Sung, et al. Power Control and Rate Management for Wireless Multimedia CDMA Systems. IEEE Transactions on Wireless Communications. vol. 49 No. 7. Jul. 1, 2001.

Chiang, et al. Geometric Programming for Communication Systems. Foundations and Trends in Communications and Information Theory. vol. 2. Aug. 1, 2005.

Chu, et al. Power Control and Rate Management for Wireless Multimedia CDMA Systems. IEEE Transactions on Wireless Communications. vol. 49 No. 7. Jul. 1, 2007.

Zhang, et al. Energy-Efficient MAC-PHY Resource Management with Guaranteed QoS in Wireless OFDM Networks. 2005 IEEE International Conference, vol. 5, pp. 3127-3131 vol. 5, May 16-20, 2005.

Lee, et al. Resource Allocation for Multiclass Services in Multiuser OFDM Systems. Consumer Communications and Networking Conference, 2008. CCNC 2008. 5th IEEE , vol., No., pp. 907-911, Jan. 10-12, 2008.

Xiaoyu, et al. A Joint Power and Rate Control Algorithm and Fairness Enhancement for Mulituser ORDM System. Vehicular Technology Conference, 2008.

\* cited by examiner

PLANNING ALLOCATION OF TIME-FREQUENCY RESOURCES IN WIRELESS OFDMA COMMUNICATION SYSTEMS

TECHNICAL FIELD

The present invention generally relates to wireless OFDMA (Orthogonal Frequency Division Multiple Access) communication systems, and especially to planning allocation of time-frequency resources in such systems.

BACKGROUND

Energy consumption in wireless cellular systems can be handled in many ways:
- By cell planning, deployment, antenna mast height, a large number of cells (and low power transmitters)
- By directional antennas and antenna arrays
- By energy efficient hardware design, e.g. for the power amplifier(s)
- By low peak-to-average based modulation, efficient error correction coding, low overhead
- By radio resource management (RRM) such as power control, rate control, scheduling, etc. However, traditionally RRM has focused on throughput related performance rather than efficient energy consumption issues. Typical examples are enhancement of system and/or individual user throughput, and fulfillment of certain Quality of Service requirements, such as minimizing delay.

Reference [1] considers energy consumption for a packet over a single communication link, where the energy consumption is minimized by tuning transmit power and transmit rate.

Although many advances have been made to handle energy consumption issues in communication systems, there is still a general need for even more energy-efficient solutions to the resource management problem.

SUMMARY

An object of the present invention is planning allocation of time-frequency resources in a wireless OFDMA communication system to at least approximately minimize transmitter energy consumption.

This object is achieved in accordance with the attached claims.

According to one aspect the present invention involves a method for planning allocation of time-frequency resources to sustain communication links from a common transmitter to multiple receivers in a wireless OFDMA communication system. This method includes the following steps:
- Select a set of time-frequency resource blocks for transmission of one packet for each communication link.
- Determine a gain-to-interference-plus-noise ratio measure for each communication link.
- Jointly estimate, within the selected set of time-frequency resource blocks, transmit power and transmit rate of the packets as functions of determined gain-to-interference-plus-noise ratio measures, to at least approximately minimize expected transmitter energy consumption.

According to another aspect the present invention involves a time-frequency resource allocation planner for planning allocation of time-frequency resources to sustain communication links from a common transmitter to multiple receivers in a wireless OFDMA communication system, wherein the planner includes:
- A resource block selector configured to select a set of time-frequency resource blocks for transmission of one packet for each communication link.
- A communication link quality measure provider configured to determine a gain-to-interference-plus-noise ratio measure for each communication link.
- A transmit power and transmit rate estimator configured to jointly estimate, within the selected set of time-frequency resource blocks, transmit power and transmit rate of the packets as functions of determined gain-to-interference-plus-noise ratio measures, to at least approximately minimize expected transmitter energy consumption.

According to still another aspect the present invention involves a network node for a wireless OFDMA communication system, where the network node includes such a time-frequency resource allocation planner.

The present invention gives several advantages:
- It enables at least approximate minimization of transmitter energy consumption in a wireless OFDMA communication system when assigning a limited set of communication resources for transmission.
- It presents a heuristic and simple solution that provides an easy way of calculating the transmit power and transmit rate (a transmit rate corresponds to a Modulation and Coding Scheme) allocations.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
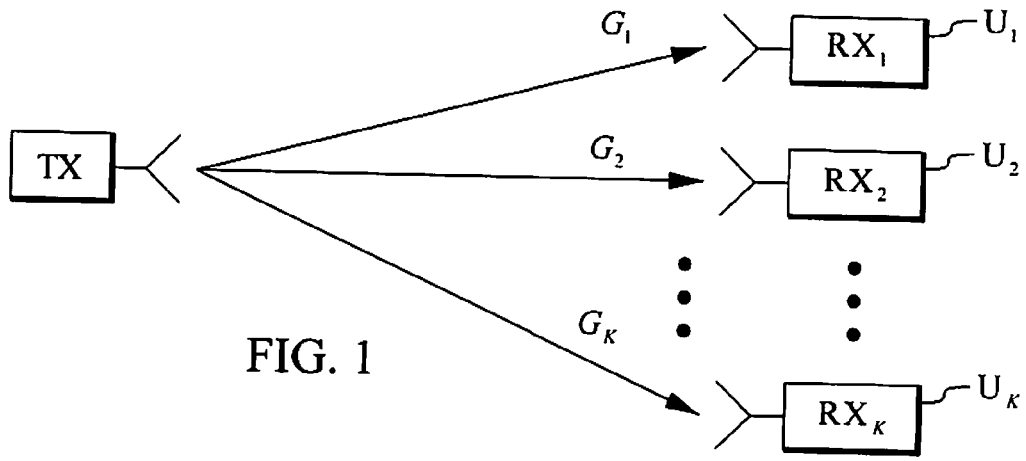
FIG. 1 is a block diagram illustrating a transmitter communicating with several receivers.

FIG. 1 is a block diagram illustrating a part of a wireless OFDMA communication system, for example an LTE (Long-Term Evolution) system, in which a transmitter TX communicates with multiple receivers $RX_1, RX_2, \ldots, RX_K$ associated with users $U_1, U_2, \ldots, U_K$ over $K>1$ (radio) communication links. These communication links are characterized by corresponding gain-to-interferenceplus-noise-ratio measures $G_1, G_2, \ldots, G_K$. Although the scenario illustrated in FIG. 1 associates each receiver with only one communication link, one or more receivers may each be associated with more than one communication link. Thus, the number of communication links K may actually be larger than the number of receivers. However, the communication links still emanate from the same common transmitter.

Figure 2:
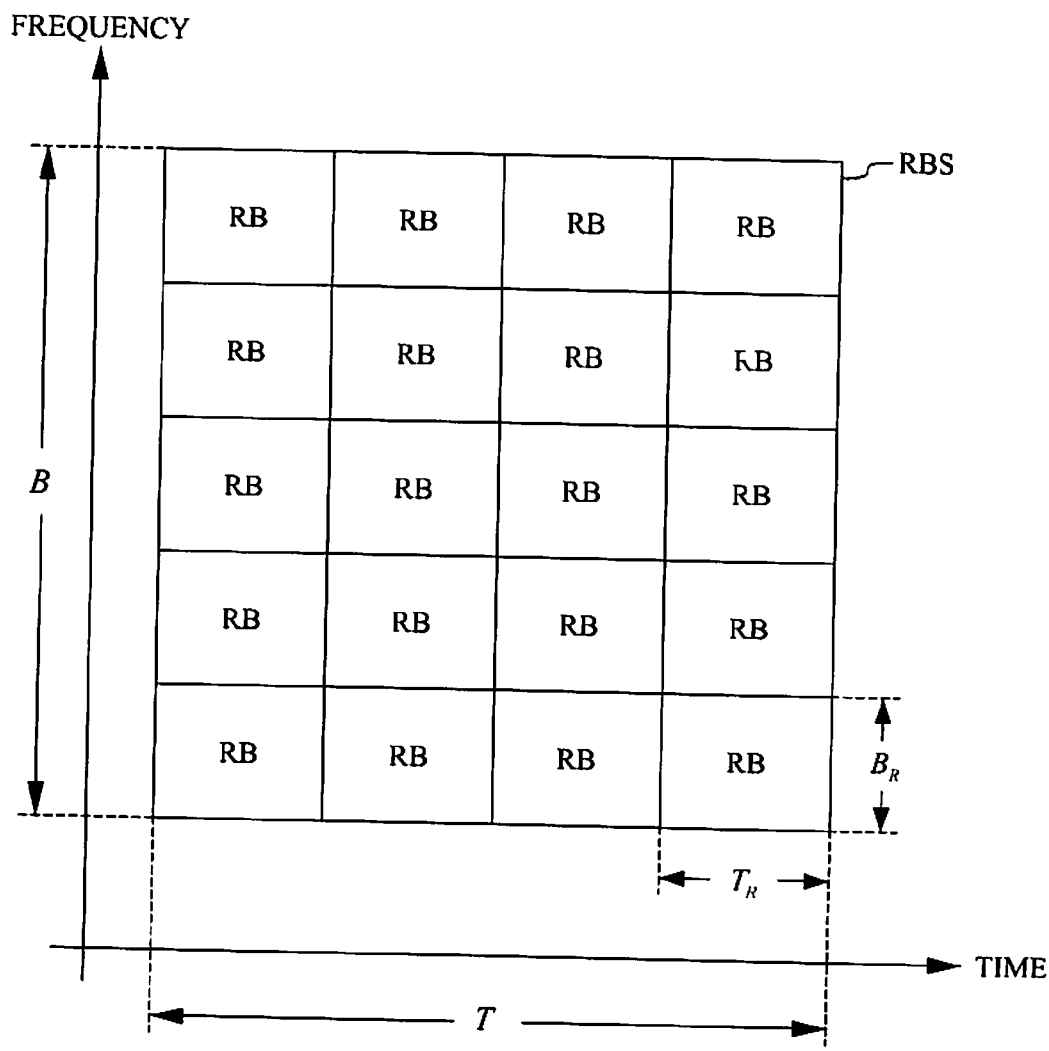
FIG. 2 is a diagram illustrating a set of time-frequency resource blocks.

FIG. 2 is a diagram illustrating a set RBS of time-frequency resource blocks RB intended to be used by the OFDMA communication system for transmission from the transmitter to the receivers over the K communication links. Each block RB has a time duration $T_R$ and occupies a bandwidth $B_R$. The resource block set RBS has a total time duration T and occupies a total bandwidth B.

Given the scenario of FIGS. 1 and 2, the present invention is based on the idea of jointly adapting transmit powers and transmit rates between the K communication links in such a way that the total transmitter energy consumption is at least approximately minimized within a given time-frequency resource block set, such as set RBS.

Figure 3:
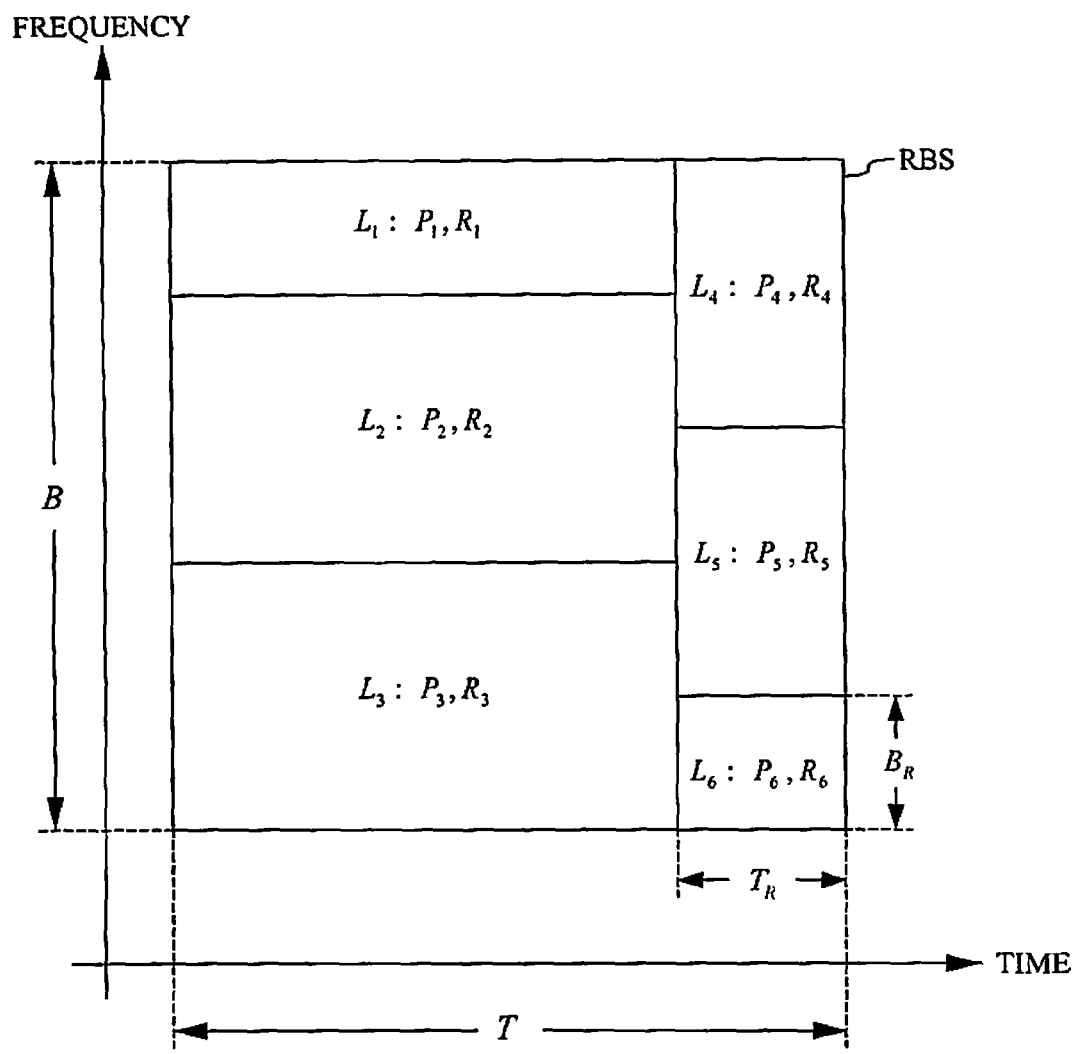
FIG. 3 is a diagram illustrating an example of time-frequency resource allocation to several radio communication links.

FIG. 3 is a diagram illustrating an example of such a time-frequency resource allocation. In FIG. 3 a packet associated with communication link 1 includes $L_1$ bits and is allocated 3 resource blocks RB with a transmit power $P_1$ and a transmit rate $R_1$. Similarly, a packet associated with communication link 2 includes $L_2$ bits and is allocated 6 resource blocks RB with a transmit power $P_2$ and a transmit rate $R_2$. This pattern is repeated for the remaining communication links 3-6. Obviously all transmit powers have to be positive, since otherwise the receivers would not receive any information and the communication links would not be sustained or maintained. The following description will focus on how to determine the transmit power $P_k$ and transmit rate $R_k$ for each communication link k, where $k=1, \ldots, K$.

Figure 4A:
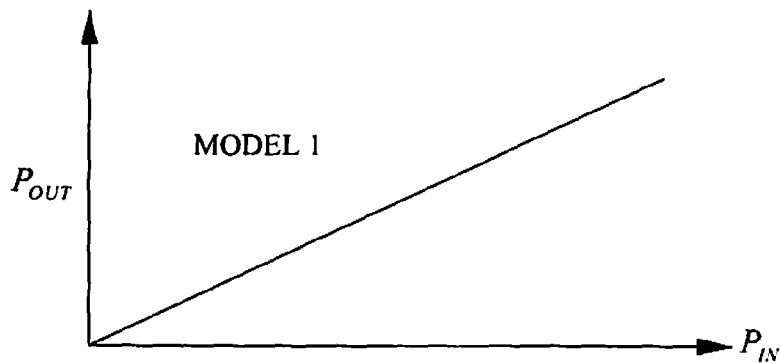
FIG. 4A-D are diagrams illustrating various examples of models of the amount of transmit power $P_{OUT}$ as a function of the power $P_{IN}$ consumed by the transmitter.
Figure 4B:
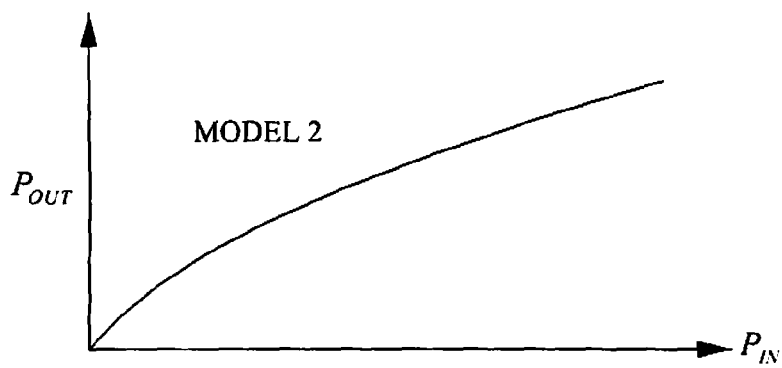
Figure 4C:
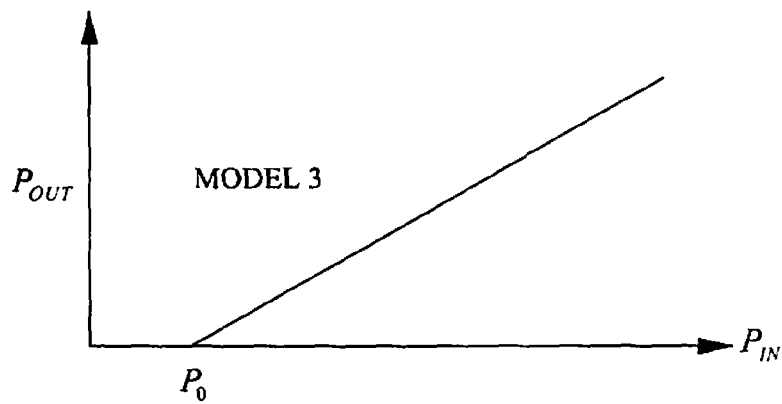
Figure 4D:
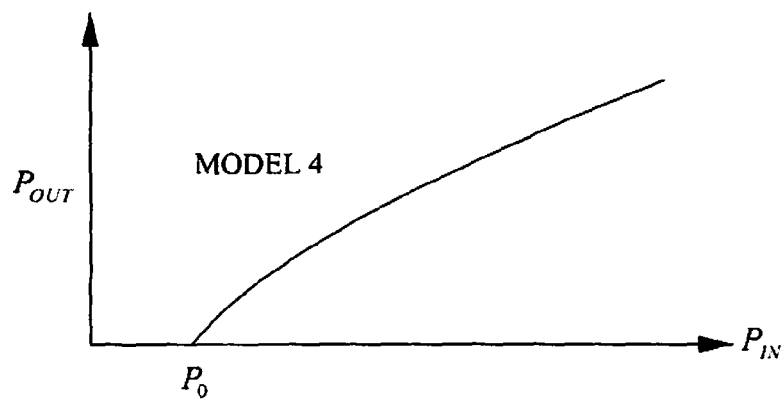

Based on practical experience from real-world base station power consumption, it is possible to model the dependence of the transmit power $P_{OUT}$ on the power $P_{IN}$ consumed by the transmitter. Four such models are illustrated in FIG. 4A-D. In these models it will be assumed that it is possible to switch off all power sinks whenever the transmitter sends nothing. FIG. 4A illustrates a first model, namely a proportional linear model. FIG. 4B illustrates a second model, in which $P_{OUT}$ is modeled as proportional to the square root of $P_{IN}$. FIG. 4C illustrates a third model, in which $P_{OUT}$ is modeled as $$P_{OUT} = \begin{cases} 0, & P_{IN} < P_0 \\ \eta(P_{IN} - P_0), & P_{IN} \geq P_0 \end{cases} \quad (1)$$

where $\eta$ is an efficiency factor. FIG. 4D illustrates a fourth model, which is a combination of the second and third model. In general, for most models $P_{IN}$ can be approximated by a polynomial in $P_{OUT}$.

In general the solution to the resource management problem will be functions of measures of gain-to-interference-plus-noise-ratios on the K communication links ($G_1, G_2, \ldots, G_K$ in FIG. 1).

Figure 5:
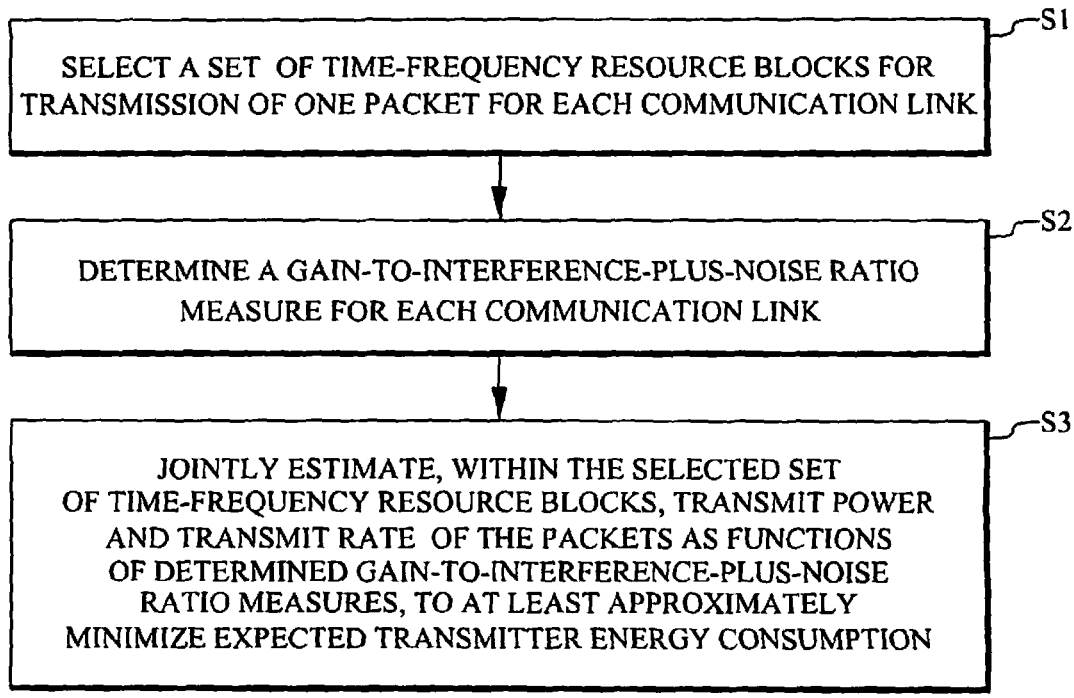
FIG. 5 is a flow chart illustrating the method in accordance with the present invention.

FIG. 5 is a flow chart illustrating the method in accordance with the present invention for planning allocation of time-frequency resources to sustain communication links from a common transmitter to multiple receivers in a wireless OFDMA communication system. Step S1 selects a set of time-frequency resource blocks for transmission of one packet for each communication link. Step S2 determines a gain-to-interference-plus-noise ratio measure for each communication link. Step S3 jointly estimates, within the selected set of time-frequency resource blocks, transmit power and transmit rate of the packets as functions of determined gain-to-interference-plus-noise ratio measures, to at least approximately minimize expected transmitter energy consumption.

The described procedure may be repeated for each new batch of packets to be transmitted on the communication links. An alternative is to repeat it for each scheduling instance. For instance, a batch of packets is to be sent, requiring a time period T. The next scheduling instance is after, say T/2, and the number of packets that have not yet been sent and any new packets then form a new batch of packets.

Figure 6:
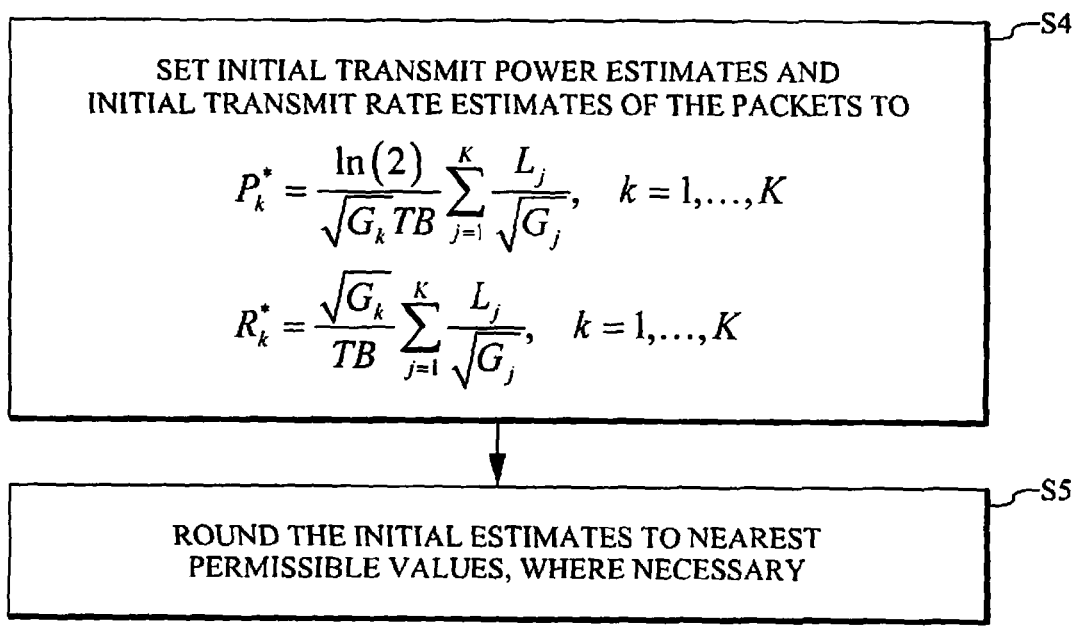
FIG. 6 is a flow chart illustrating an embodiment of the method in accordance with the present invention.

FIG. 6 is a flow chart illustrating an embodiment of the method in accordance with the present invention. This embodiment will be based on model 3 in FIG. 4C, but other models could be handled similarly. As is shown in the APPENDIX, in this model the transmit powers and transmit rates of the packets to be transmitted are initially set to transmit power estimates $P^*_k$ and transmit rate estimates $R^*_k$ based on equations (24) and (25). Thus, in the embodiment of FIG. 6, step S4 sets initial transmit power estimates $P^*_k$ and initial transmit rate estimates $R^*_k$ of the packets to $$P^*_k = \frac{\ln(2)}{\sqrt{G_k} \, TB} \sum_{j=1}^{K} \frac{L_j}{\sqrt{G_j}}, k = 1, \ldots, K$$

$$R^*_k = \frac{\sqrt{G_k}}{TB} \sum_{j=1}^{K} \frac{L_j}{\sqrt{G_j}}, k = 1, \ldots, K$$

where
  $G_k$ is the gain-to-interference-plus-noise-ratio measure on communication link k,
  $G_j$ is the gain-to-interference-plus-noise-ratio measure on communication link j,
  T is the total available time for allocation of time-frequency resources,
  B is the total available bandwidth,
  K is the total number of communication links,
  $L_j$ is the number of bits in a packet on communication link j.

Step S5 then rounds the initial estimates $P^*_k$ and $R^*_k$ to nearest permissible values, where necessary (some initial estimates $P^*_k$ and $R^*_k$ may already be equal to permissible values).

The gain-to-interference-plus-noise-ratio measures $G_k$ are, for example, based on (complex) channel estimates $H_k$, interference estimates $I_k$ and noise estimates $\sigma_k^2$, typically in accordance with $$G_k = \frac{|H_k|^2}{I_k + \sigma_k^2}, k = 1, \ldots, K \quad (2)$$

These gain-to-interference-plus-noise-ratio measures $G_k$ or their separate components are typically reported by the mobile stations (for example user equipments (UEs) in LTE) that contain the receivers. The measurements are typically performed in the mobile stations by comparing reference or pilot signals transmitted by the transmitter to the corresponding signals actually received by the receivers.

The gain-to-interference-plus-noise-ratio measures $G_k$ are ideally be represented by the full gain-to-interference-plus-noise-ratios in equations (2), but if only some of the components are available, they could be represented by the gain-to-interference ratios $|H_k|^2/I_k$, the gain-to-noise ratios $|H_k|^2/\sigma^2$ or simply the (channel) gains $|H_k|^2$. Furthermore, if the channel transfer function is not known instantaneously, one may instead consider, and replace, $|H_k|^2$ with $E\{|H_k|^2\}$ where $E\{\ldots\}$ is the expectation value.

The expressions above for the estimates $P^*_k$ and $R^*_k$ are based on sums that include all gain-to-interference-plus-noise-ratio measures $G_k$. However, an alternative is to neglect terms below a corresponding predetermined threshold in one or both of the estimates $P^*_k$ and $R^*_k$.

The resource block set RBS may be selected by summing up the total number of bits ($\Sigma_{k=1}^{K} L_k$) to be sent in the current batch of packets. This sum may then be used to look up a suitable resource block set, represented by the time duration T, from a resource block set table.

So far it has been assumed that the selected resource block set is the final set on which the packets will be transmitted. However, it is also possible to consider this set as a first set, and to perform the same procedure on one or more further sets, to find the set that gives the least expected transmitter power consumption. This is illustrated in FIG. 7A-B.

Figure 7A:
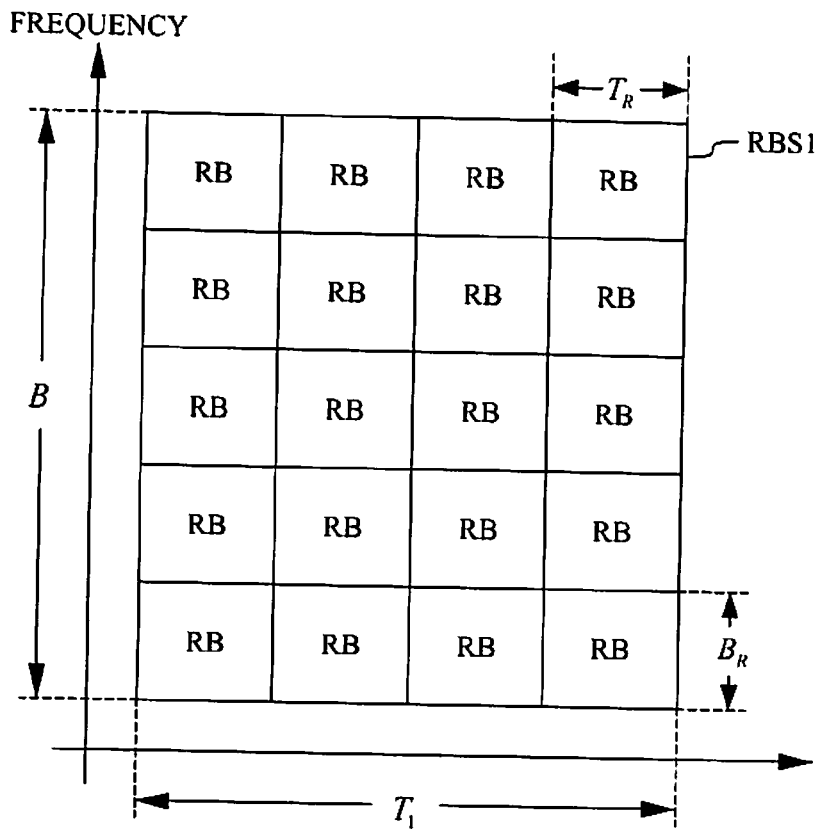
FIG. 7A-B are diagrams illustrating two sets of time-frequency resource blocks.

FIG. 7A corresponds to FIG. 2 and illustrates the first selected resource block set RBS1. The procedure described above is performed on this set and results in a corresponding set of transmit powers and transmit rates. It also results in a certain expected transmitter energy consumption, for example in accordance with equation (22) in the APPENDIX. FIG. 7B illustrates a second, larger resource block set RBS2, which is used to perform the same procedure. This gives other transmit powers and transmit rates, and usually also another expected transmitter energy consumption. By comparing the expected transmitter energy consumptions obtained in the two cases, it is possible to choose the resource block set (and corresponding transmit powers and transmit rates) that gives the lowest expected transmitter energy consumption.

Figure 7B:
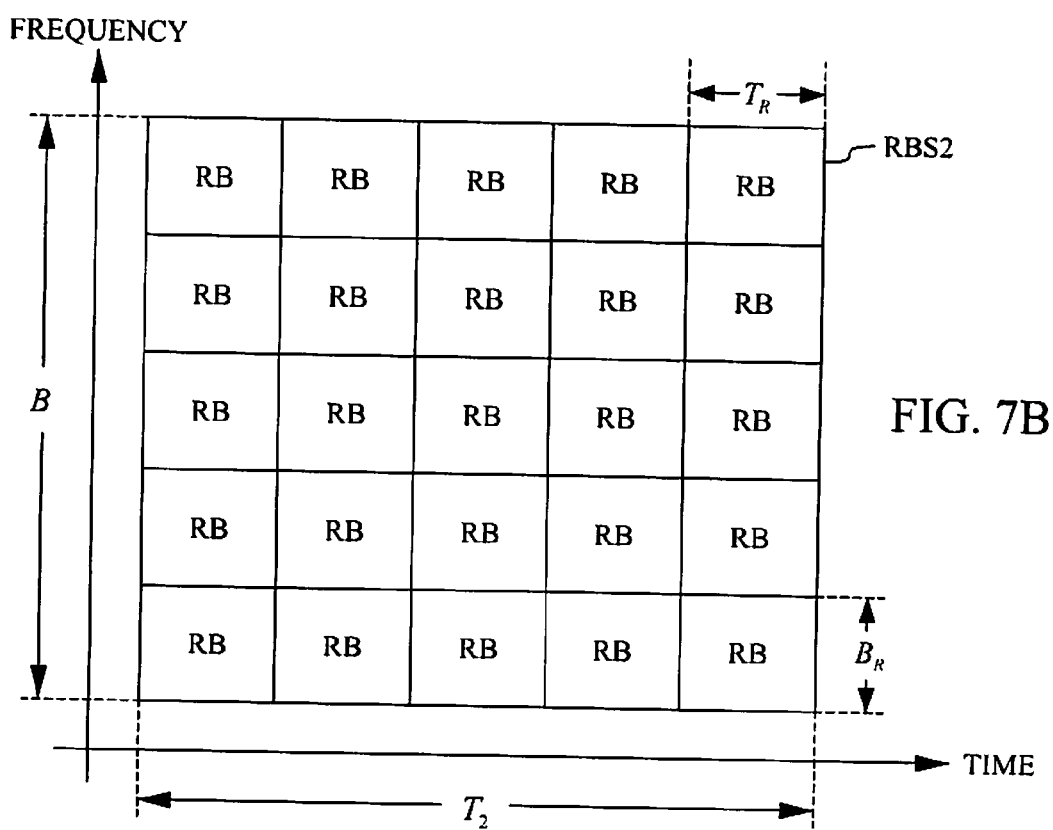

It is also possible to select a smaller resource block set instead of a larger set as in FIG. 7B. Another possibility is to select both a smaller and a larger set and choose the set that gives the lowest expected transmitter energy consumption.

Still another possibility is to select both a smaller and a larger set and to determine in which direction there is a decrease (if any) in expected transmitter energy consumption. For example, if one finds that a larger resource block set gave a lowest expected transmitter energy consumption, one may try an even larger set to determine whether this gives an even lower expected transmitter energy consumption. This procedure may be repeated until the expected transmitter energy consumption no longer decreases.

Figure 8:
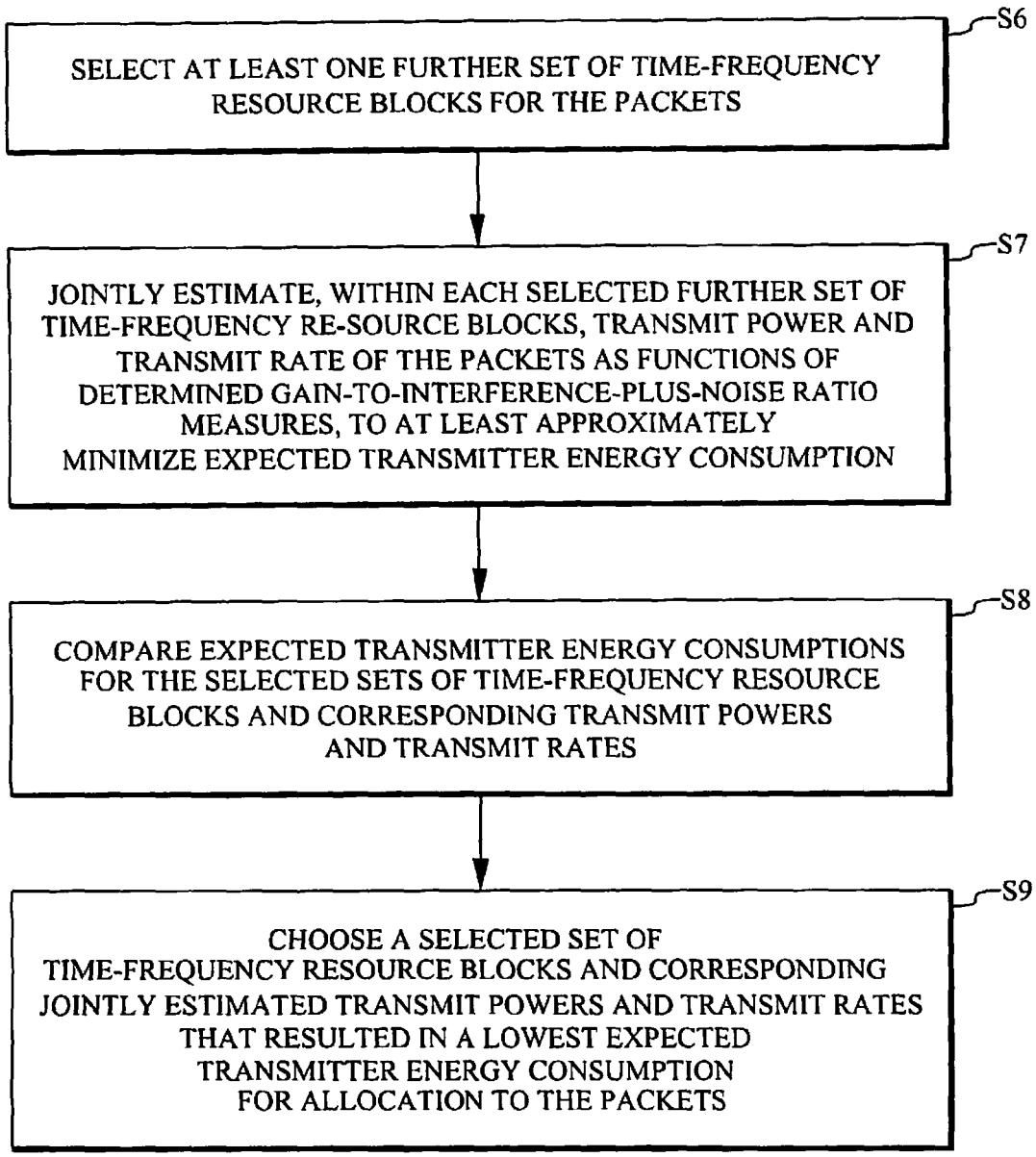
FIG. 8 is a flow chart illustrating another embodiment of the method in accordance with the present invention.

FIG. 8 is a flow chart illustrating such embodiments of the method in accordance with the present invention. Step S6 selects at least one further set of time-frequency resource blocks for the packets. Step S7 jointly estimates, within each selected further set of time-frequency resource blocks, transmit power and transmit rate of the packets as functions of determined gain-tointerference-plus-noise ratio measures, to at least approximately minimize expected transmitter energy consumption. Step S8 compares expected transmitter energy consumptions for the selected sets of time-frequency resource blocks and corresponding transmit powers and transmit rates. Step S9 chooses a selected set of time-frequency resource blocks and corresponding jointly estimated transmit powers and transmit rates that resulted in a lowest expected transmitter energy consumption for allocation to the packets.

Figure 9:
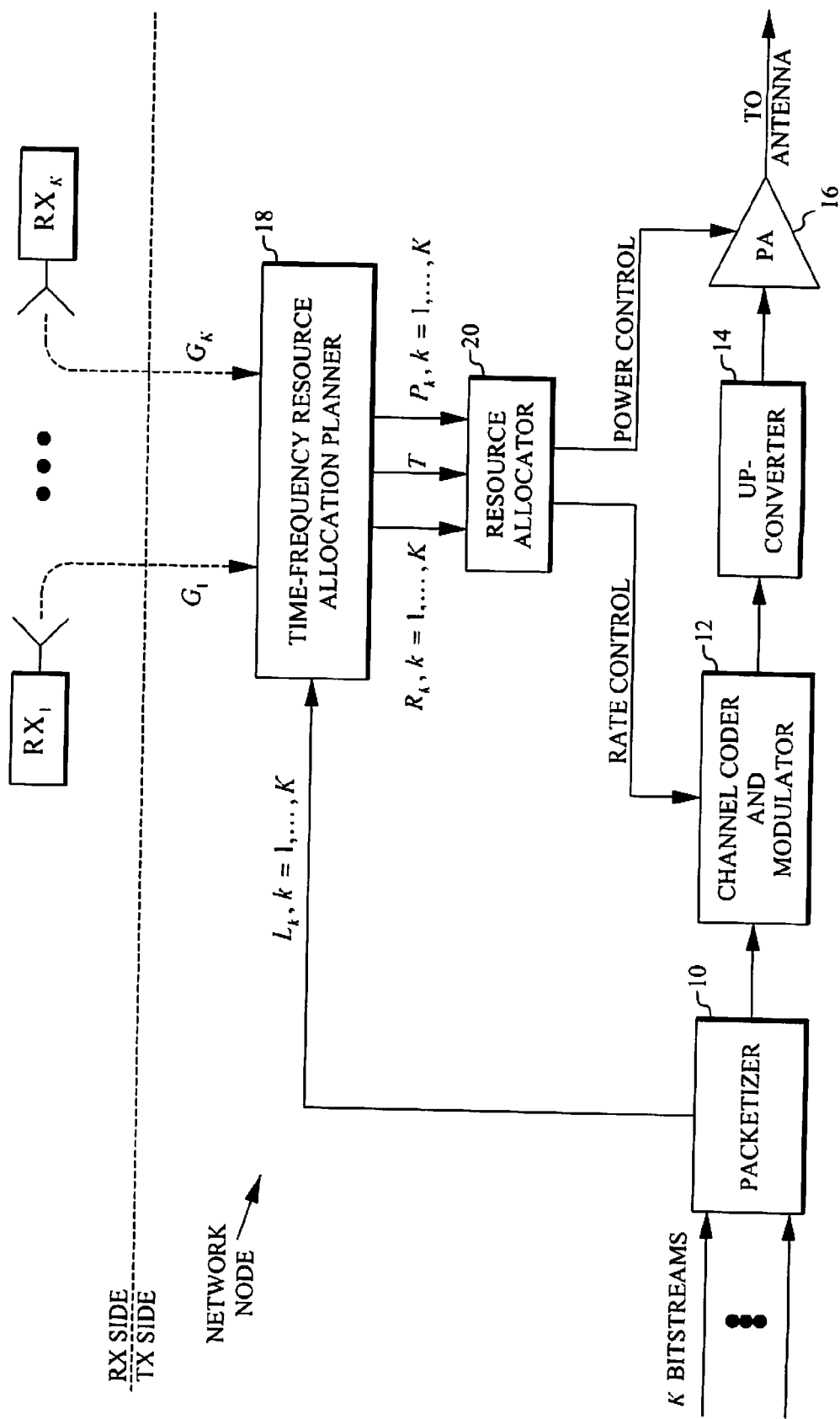
FIG. 9 is a block diagram illustrating an example of a network node including a time-frequency resource allocation planner in accordance with the present invention.

FIG. 9 is a block diagram illustrating an example of a network node including a time-frequency resource allocation planner in accordance with the present invention. In order to facilitate the description, FIG. 9 only shows elements that are useful to explain the principles of the present invention. A network node, for example a base station or radio relay station, includes a packetizer 10 receiving K bitstreams to be transmitted to receivers $RX_1, RX_2, \ldots, RX_K$ (there may actually be more communication links than receivers, as discussed above). Each bitstream is packetized into packets of respective bit lengths $L_k$. The packets, one packet from each bitstream, are forwarded to a channel coder and modulator 12 that channel codes and transforms them into OFDM signals, which are up-converted to radio frequency in an up-converter 14 and amplified in a power amplifier 16 (PA). The amplified signals are then forwarded to an antenna.

The network node in FIG. 9 also includes a time-frequency resource allocation planner 18 in accordance with the present invention. The planner 18 receives the packet lengths $L_k$ of the current batch of packets from the packetizer 10 and the gain-to-interference-plus-noise-ratio measures $G_k$ from the receivers $RX_1, RX_2, \ldots, RX_K$. From this information the planner 18 determines the resource block set (the time T), the transmit powers $P_k$ and the transmit rates $R_k$ in accordance with the principles described above. After determining these parameters the planner 18 forwards them to a resource allocator 20, which performs the actual rate control of the channel coder and modulator 12 and the power amplifier 16 in accordance with standard procedures.

In FIG. 9 the resource allocator 20 has been separated from the time-frequency resource allocation planner 18. However, an alternative is to integrate it into the planner 18.

Figure 10:
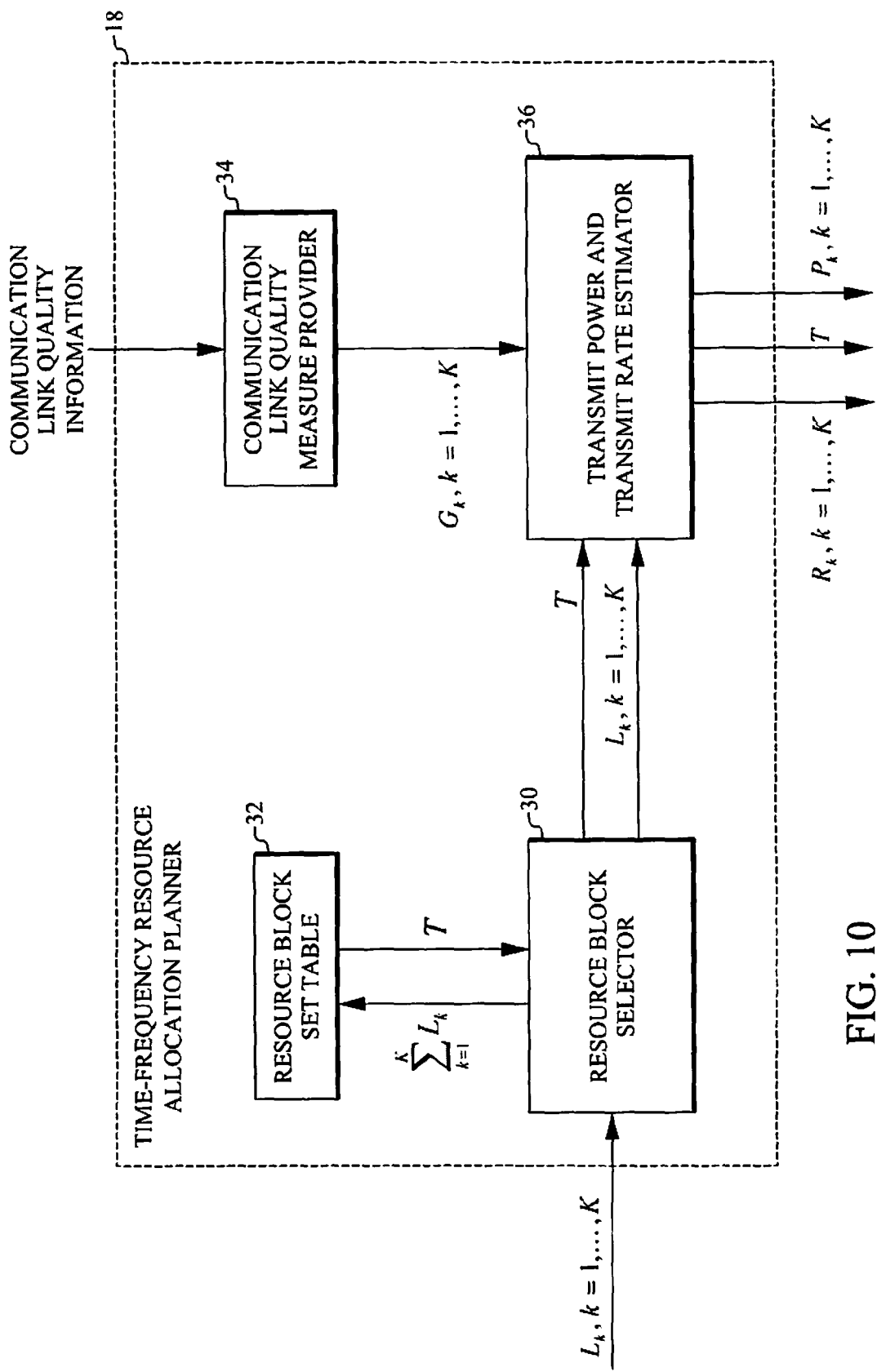
FIG. 10 is a block diagram illustrating an embodiment of a time-frequency resource allocation planner in accordance with the present invention.

FIG. 10 is a block diagram illustrating an embodiment of a time-frequency resource allocation planner in accordance with the present invention. It includes a resource block selector 30 configured to select a set RBS of time-frequency resource blocks RB for transmission of one packet for each communication link. In the illustrated embodiment the received packet lengths $L_k$ of the current batch of packets are forwarded to the resource block selector 30, which determines the total number of bits in the batch and looks up a corresponding resource block set, represented by a time interval T, in a resource block set table 32. A communication link quality measure provider 34 is configured to determine a gain-to-interference-plus-noise ratio measure $G_k$ for each communication link, typically from determined communication link quality information, as discussed above with reference to equation (2). The time interval T representing the selected resource block set, the individual packet lengths $L_k$, and the gain-to-interference-plus-noise ratio measures $G_k$ are forwarded to a transmit power and transmit rate estimator 36. The estimator 36 is configured to jointly estimate, within the selected set of time-frequency resource blocks, transmit power $P_k$ and transmit rate $R_k$ of the packets as functions of determined gain-to-interference-plus-noise ratio measures, to at least approximately minimize expected transmitter energy consumption using the principles described above and in the APPENDIX. The parameters $P_k$, $R_k$ and T are then forwarded to the resource allocator 20 (FIG. 9).

Figure 11:
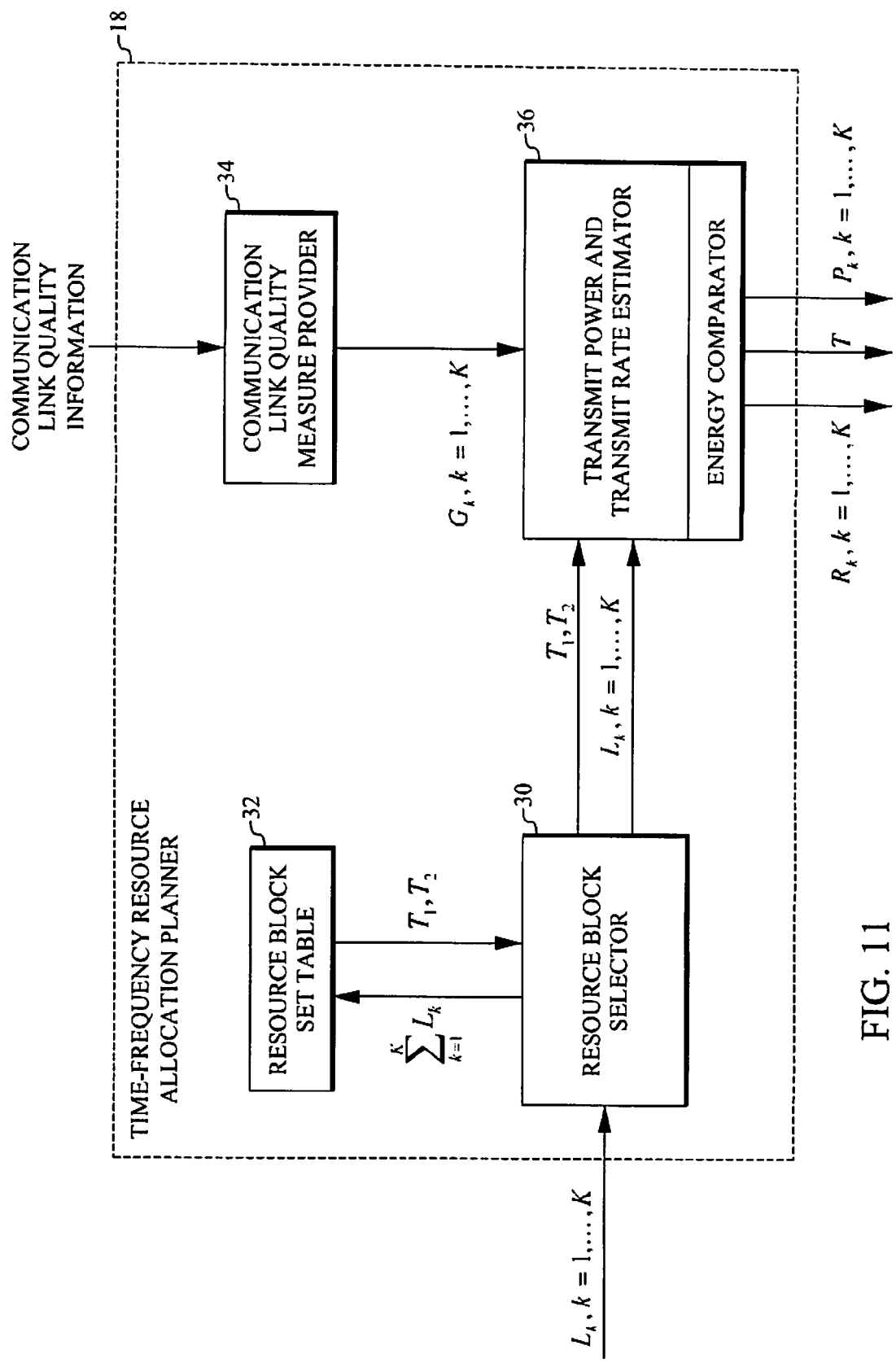
FIG. 11 is a block diagram illustrating another embodiment of a time-frequency resource allocation planner in accordance with the present invention.

FIG. 11 is a block diagram illustrating another embodiment of a time-frequency resource allocation planner in accordance with the present invention. This embodiment differs from the embodiment of FIG. 10 in that the resource block selector 30 is configured to obtain more than one resource block set from the resource block set table 32 These sets are represented by $T_1$, $T_2$ in FIG. 10. This in turn means that the estimator 36 is configured to include an energy comparator that is configured to choose the resource block set that results in the lowest expected transmitter energy consumption and the corresponding transmit powers and transmit rates. These parameters are then forwarded to the resource allocator 20 (FIG. 9) as the resource allocation parameters $P_k$, $R_k$ and T.

In FIGS. 10 and 11 the resource block table 32 has been separated from the resource block selector 30. However, an alternative is to integrate it into the selector 30.

The functions described above may be implemented in hardware using any conventional hardware technology, such as Integrated Circuit (IC) technology. Alternatively, at least some of the functions may be implemented in software for execution on suitable processing hardware, such as a microprocessor and/or digital signal processor, including the possibility of using the general processing capabilities already present in the base station or radio relay station.

It will be understood by those skilled in the art that various modifications and changes may be made to the present invention without departure from the scope thereof, which is defined by the appended claims.

APPENDIX

This appendix starts by considering the case where transmit power, transmit rate, and time-frequency resources are assumed to be continuous. The purpose of this idealization is to illustrate that there exists an optimization problem and give insight into heuristics for power and rate settings based on communication link gain-to-interference-plus-noise-ratios. Subsequently, somewhat more realistic constraints are introduced, where discrete values or ranges of the transmit parameters are considered. Nonetheless, the analysis based on continuous parameters is considered to be a good approximation of the discrete cases, as transmit power is often semi-continuous and MCSs (Modulation and Coding Schemes) often include many available rates.

First, the number $N_k$ of time-frequency resources for communication link k is $$N_k = \left\lceil \frac{L_k}{T_R \cdot B_R} \cdot \frac{1}{R_k} \right\rceil \approx \frac{L_k}{T_R \cdot B_R} \cdot \frac{1}{R_k} \quad (3)$$

where
- $\lceil \ldots \rceil$ is the ceiling operator (round upwards to nearest integer),
- $L_k$ is the number of bits in a packet on communication link k,
- $T_R$ is the time duration of a time-frequency resource block,
- $B_R$ is the bandwidth of a time-frequency resource block, and
- $R_k$ is the spectral efficiency (here denoted transmit rate) of communication link k in b/Hz/s.

In (3) it has been assumed that the number $N_k$ of required time-frequency resources is continuous rather than discrete.

Assuming Shannon capacity achieving coding and modulation, i.e. a complex Gaussian distributed signal in AWGN (Additive White Gaussian Noise), the transmit rate $R_k$ for communication link k is $$R_k = lg_2(1 + G_k P_k) \quad (4)$$

where
- $lg_2$ denotes the logarithm to the base 2,
- $G_k$ is the gain-to-interference-plus-noise-ratio on communication link k, and
- $P_k$ is the radiated power (here denoted transit power) per time-frequency resource block for communication link k.

For more realistic MCSs, the dependency of the transmit rate $R_k$ on the gain-to-interference-plus-noise-ratio $G_k$ and the transmit power $P_k$ looks different but is upper bounded by (4). However, since the MCSs used today are quite close to Shannon capacity, equation (4) will be used as a good approximation.

The total time $T^{(c)}$ for the transmission of all K communication links is $$T^{(c)} = T_R \left[ \frac{B_R \sum_{k=1}^{k} N_k}{B} \right] \approx \frac{T_R B_R \sum_{k=}^{K} N_k}{B} \quad (5)$$

$$= \sum_{k=1}^{K} \frac{L_k}{B \cdot lg_2(1 + G_k P_k)} = \sum_{k=1}^{K} T_k$$

where B is the total available bandwidth.

As noted in connection with the description of FIG. 4A-D above, it is possible to model the amount of transmit power $P_{OUT}$ as a function of the power $P_{IN}$ consumed by the transmitter. The following discussion will be based on equation (1) (model 3 in FIG. 4C), but other models could be handled similarly. When the transmitter is sending, there is a fixed consumed idle power $P_0$, see FIG. 4C. In addition to the fixed idle power $P_0$, a power $P_k^{(c)} = P_k \eta^{-1}$ is consumed for each time-frequency resource. The efficiency factor $\eta$ typically is 0.25-0.33 for common power amplifier techniques and the idle power $P_0$ for larger cellular system base stations with PAs typically is 100-200 W.

Based on this model, the expected transmitter energy consumption $E^{(c)}$ for all K communication links is $$E^{(c)} = P_0 \cdot T^{(c)} + \sum_{k=1}^{K} T_R N_k P_k \eta^{-1} \quad (6)$$

$$= \sum_{k=1}^{K} \frac{L_k}{B} \frac{P_0}{lg_2(1 + G_k P_k)} + \sum_{k=1}^{K} \frac{L_k}{B_R} \frac{P_k/\eta}{lg_2(1 + G_k P_k)}$$

$$= \sum_{k=1}^{K} \frac{L_k}{B_R} \frac{P_0 m^{-1} + P_k \eta^{-1}}{lg_2(1 + G_k P_k)} = \sum_{k=1}^{K} E_k$$

where $m = B/B_R$.

It is now possible to determine the (at least approximately) optimal transmit power and transmit rate allocation by solving the following optimization problem $$\min E^{(c)} \quad (7)$$

$$\text{s.t.} \sum_{k=1}^{K} T_k = T$$

where s.t. is an abbreviation for "such that",

When the problem is formulation as in (7), the resources are constrained. This means that in general it is not possible to just minimize the expected total energy consumption $E^{(c)}$. The solution to (7) may instead be found by minimizing a Lagrangian L based on (7) and defined as $$L = E^{(c)} + \lambda \left( \sum_{k=1}^{K} T_k - T \right) \quad (8)$$

where $\lambda$ is a Lagrange parameter. This is achieved by taking the partial derivative with respect to $P_k$ and equating the resulting equations to zero (one equation for each k), i.e.

$$\frac{\partial}{\partial P_k}\left( E^{(c)} + \lambda \left( \sum_{j=1}^{K} T_j - T \right) \right) = 0, k = 1, \ldots, K \quad (9)$$

which gives $$\frac{\partial}{\partial P_k}\left( \sum_{j=1}^{K} \frac{L_j}{B_R} \frac{P_0 m^{-1} + P_j/\eta}{lg_2(1+G_j P_j)} + \lambda \left( \sum_{j=1}^{K} \frac{L_j}{B_R} \frac{m^{-1}}{lg_2(1+G_j P_j)} - T \right) \right) = 0,$$

$$k = 1 \ldots K$$
(10)

which after performing the partial differentiation gives $$(1+G_k P_k)\ln(1+G_k P_k) - G_k P_k = \eta m^{-1} G_k (\lambda+P_0), k=1,\ldots K \quad (11)$$

where "ln" denotes the natural logarithm to the base e. Equation (11) has to be solved for all K communication links, and $\lambda$ has to be adjusted to accommodate all transmissions within the given resources/time duration.

Now, the transmissions on the communication links having a low gain-to-interference-plus-noise ratio $G_k$ will require the highest transmitter energy consumption. These communication links are the ones that one may primarily strive to optimize for. Mostly, these communication links will have a low SINR. Thus, in order to find an approximate solution to (11) it is convenient to assume low SINRs (up to 0 dB). One can then find an approximate closed form solution for the transmit rate and transmit power allocation. The transmit powers $P_k$ are approximated as follows $$\ln(1+G_k P_k) \approx G_k P_k - (G_k P_k)^2/2 + \ldots \quad (12)$$

Using (11) and neglecting terms in $G_k P_k$ of orders higher than 2 implies that $$(G_k P_k)^2/2 \approx \eta m^{-1} G_k (\lambda+P_0) \quad (13)$$

which gives the approximated transmit powers $$P_k^* \approx \begin{cases} \sqrt{\dfrac{2\eta m^{-1}(\lambda+P_0)}{G_k}}, & \text{if } \lambda > -P_0 \\ 0, & \text{if } \lambda \leq -P_0 \end{cases} \quad (14)$$

Based on (4) and (14) the corresponding transmit rates are $$R_k = lg_2(1+G_k P_k) \approx lg_2(1+\sqrt{2\eta m^{-1} G_k(\lambda+P_0)}) \quad (15)$$

The Lagrangian parameter $\lambda$ may now be calculated by using equations (5), (15) and the constraint in (7). This leads to $$\sum_{k=1}^{K} \frac{L_k}{B} \frac{1}{lg_2\left(1+\sqrt{2\eta m^{-1} G_k(\lambda+P_0)}\right)} = T \quad (16)$$

Assuming a small argument for the rate, since we have small SINRs, the rate expression in the denominator can be Taylor expanded $(\ln(1+x)=x+\ldots)$. This makes it possible to obtain an approximate closed form solution for $\lambda$, i.e.

$$\lambda \approx \left( \frac{1}{TB} \sum_{k=1}^{K} \frac{L_k \ln(2)}{\sqrt{2\eta m^{-1} G_k}} \right)^2 - P_0 \quad (17)$$

Since $\lambda \gg -P_0$ equation (17) may be used to simplify equation (14) into $$P_k^* \approx \frac{\ln(2)}{\sqrt{G_k}} \frac{1}{TB} \sum_{j=1}^{K} \frac{L_j}{\sqrt{G_j}} \quad (18)$$

This approximate transmit power $P_k^*$ gives in turn the approximate transmit rate $R_k^*$ (by using the Taylor expansion $\ln(1+x)=x+\ldots$)

$$R_k^* \approx lg_2\left( 1 + \left( \frac{\ln(2)\sqrt{G_k}}{TB} \sum_{j=1}^{K} \frac{L_j}{\sqrt{G_j}} \right) \right) \approx \frac{\sqrt{G_k}}{TB} \sum_{j=1}^{K} \frac{L_j}{\sqrt{G_j}} \quad (19)$$

Inserting equation (19) into equation (16) gives $$\sum_{k=1}^{K} \frac{L_k}{B \cdot R_k^*} = \sum_{k=1}^{K} \frac{L_k}{\dfrac{\sqrt{G_k}}{T} \sum_{j=1}^{K} \dfrac{L_j}{\sqrt{G_j}}} \quad (20)$$

$$= \sum_{k=1}^{K} \frac{T \cdot L_k}{\sqrt{G_k}} \Big/ \sum_{j=1}^{K} \frac{L_j}{\sqrt{G_j}}$$

$$= T$$

which indicates that the constraint in (7) is fulfilled with the approximate transmit rate for low SINRs. The radiated energy per communication link k is then approximately $$E_k^* = \frac{L_k}{B_R R_k} P_k \approx \frac{L_k}{B_R R_k^*} P_k^* \quad (21)$$

$$= \frac{L_k}{B_R} \frac{\dfrac{\ln(2)}{\sqrt{G_k} TB} \sum_{j=1}^{K} \dfrac{L_j}{\sqrt{G_j}}}{\dfrac{\sqrt{G_k}}{TB} \sum_{j=1}^{K} \dfrac{L_j}{\sqrt{G_j}}}$$

$$= \frac{L_k \ln(2)}{B_R G_k}$$

The total consumed energy is then approximately $$E^{(c)} = TP_0 + \ln(2)B_R^{-1} \sum_{k=1}^{K} L_k G_k^{-1} \qquad (22)$$

In summary, for the continuous case and low SINR values the optimization problem $$\min E^{(c)} \qquad (23)$$
$$\text{s.t.} \sum_{k=1}^{K} T_k = T$$

is approximately solved by the transmit powers $$P_k^* \approx \frac{\ln(2)}{\sqrt{G_k}\, TB} \sum_{j=1}^{K} \frac{L_j}{\sqrt{G_j}}, k = 1, \ldots K \qquad (24)$$

and the transmit rates $$R_k^* \approx \frac{\sqrt{G_k}}{TB} \sum_{j=1}^{K} \frac{L_j}{\sqrt{G_j}}, k = 1, \ldots K \qquad (25)$$

For the discrete case the number of time-frequency resources $N_k$ used for communication link k is an integer. Furthermore, the transmit rate $R_k$ for communication link k now is restricted to a set $\mathcal{R}$ of discrete transmit rates given by the available MCSs. The transmit powers $P_k$ may still be considered as a continuous variable defined in an interval $$P_k^{(min)} \le P_k \le P_k^{(max)} \qquad (26)$$

where $P_k^{(min)} \ge 0$ is the minimum transmit power, and $P_k^{(max)}$ is the maximum permitted transmit power. This interval may be considered as a continuous set $\mathcal{P}$ of power values. As an alternative the transmit powers $P_k$ may be restricted to a discrete set $\mathcal{P}$ of power values.

In the discrete case the optimization problem (23) is, for low SINR values, approximately solved by the powers $P^*_k$ from (24) and the rates $R^*_k$ from (25), rounded to nearest permissible values, where necessary.

By inspection of equation (10) it is appreciated that the power consumption model may be written more generally as an arbitrary polynomial parameterized in some constants $c_i$. Further, the transmit rate or throughput may be also be written as a polynomial parameterized in constants $b_i$ which are dependent on the gain-to-interference-plus-noise-ratios. Calculating the derivative of the Lagrange function, after simplification, is then equivalent to calculating $$\frac{\partial}{\partial P_k}\left(\sum_{j=1}^{K} \frac{\sum_{i=0}^{\infty} c_i P_j^i}{\sum_{i=0}^{\infty} b_i P_j^i} + \sum_{j=1}^{K} \frac{\lambda}{\sum_{i=0}^{\infty} b_i P_j^i}\right) = 0, k = 1, \ldots K \qquad (27)$$

Let $a_0 = c_0 + \lambda$ and $a_i = c_i$, $\forall i > 0$. This gives $$\frac{\partial}{\partial P_k} \frac{\sum_{i=0}^{\infty} a_i P_k^i}{\sum_{i=0}^{\infty} b_i P_k^i} = 0, k = 1, \ldots K \qquad (28)$$

which implies that $$\frac{\sum_{i=1}^{\infty} i \cdot a_i P_k^{i-1}}{\sum_{i=0}^{\infty} a_i P_k^i} = \frac{\sum_{i=1}^{\infty} i \cdot b_i P_k^{i-1}}{\sum_{i=0}^{\infty} b_i P_k^i}, k = 1, \ldots K \qquad (29)$$

As can be seen, equations (29) are non-linear but can, together with the resource constraint, be solved with standard numerical equation solvers like Newton-Raphson or alike (the sums are typically truncated after a few terms, for example 2-5 terms).

Solving equations (29) gives the optimal transmit powers, which in turn are used to calculate the corresponding transmit rates.

ABBREVIATIONS

AWGN Additive White Gaussian Noise
LTE Long-Term Evolution
MCS Modulation and Coding Scheme
OFDM Orthogonal Frequency Division Multiplexing
OFDMA Orthogonal Frequency Division Multiple Access
RRM Radio Resource Management
SINR Signal to Interference Noise Ratio
SNR Signal to Noise Ratio
UE User Equipment

REFERENCE

[1] P. Larsson, Z. Zhang, "Communication link adaptation and power control with energy minimization", WO 2007/091930 A1.

The invention claimed is:

1. A method for planning allocation of time-frequency resources to sustain communication links from a common transmitter (TX) to multiple receivers ($RX_1, \ldots, RX_K$) in a wireless Orthogonal Frequency Division Multiple Access (OFDMA) communication system, the method comprising:

selecting a set (RBS) of time-frequency resource blocks (RB) for transmission of one packet for each communication link;

determining a gain-to-interference-plus-noise ratio measure ($G_k$) for each communication link; and jointly estimating within the selected set of time-frequency resource blocks, transmit power ($P_k$) and transmit rate ($R_k$) of the packets as functions of determined gain-to-interference-plus-noise ratio measures, to at least approximately minimize expected transmitter energy consumption;

wherein jointly estimating includes:
setting initial transmit power estimates $P^*_k$ and initial transmit rate estimates $R^*_k$ of the packets to:

$$P^*_k = \frac{\ln(2)}{\sqrt{G_k}\,TB} \sum_{j=1}^{K} \frac{L_j}{\sqrt{G_j}}, k = 1, \ldots K$$

$$R^*_k = \frac{\sqrt{G_k}}{TB} \sum_{j=1}^{K} \frac{L_j}{\sqrt{G_j}}, k = 1, \ldots K$$

where:
$G_k$ is the gain-to-interference-plus-noise-ratio measure on communication link k,
$G_j$ is the gain-to-interference-plus-noise-ratio measure on communication link j,
T is the total available time for allocation of time-frequency resources,
B is the total available bandwidth,
K is the total number of communication links, and
$L_j$ is the number of bits in a packet on communication link j, and
rounding the initial estimates $P^*_k$ and $R^*_k$ to nearest permissible values, where necessary.

2. The method of claim 1, further comprising using the selected set of time-frequency resource blocks and the jointly estimated transmit powers and transmit rates for allocation to the packets.

3. The method of claim 1, further comprising:
selecting at least one further set (RBS2) of time-frequency resource blocks (RB) for the packets;
jointly estimating, within each selected further set (RBS2) of time-frequency resource blocks, transmit power and transmit rate of the packets as functions of determined gain-to-interference-plus-noise ratio measures, to at least approximately minimize expected transmitter energy consumption;
comparing expected transmitter energy consumptions for the selected sets (RBS1, RBS2) of time-frequency resource blocks and corresponding transmit powers and transmit rates; and
choosing a selected set of time-frequency resource blocks and corresponding jointly estimated transmit powers and transmit rates that resulted in a lowest expected transmitter energy consumption for allocation to the packets.

4. A time-frequency resource allocation planner for planning allocation of time-frequency resources to sustain communication links from a common transmitter (TX) to multiple receivers ($RX_1, \ldots, RX_K$) in a wireless Orthogonal Frequency Division Multiple Access (OFDMA) communication system, the planner comprising:
a resource block selector configured to select a set (RBS) of time-frequency resource blocks (RB) for transmission of one packet for each communication link;
a communication link quality measure provider configured to determine a gain-to-interference-plus-noise ratio measure ($G_k$) for each communication link; and
a transmit power and transmit rate estimator configured to jointly estimate, within the selected set of time-frequency resource blocks, transmit power ($P_k$) and transmit rate ($R_k$) of the packets as functions of determined gain-to-interference-plus-noise ratio measures, to at least approximately minimize expected transmitter energy consumption;
wherein the transmit power and transmit rate estimator is configured to set initial transmit power estimates $P^*_k$ and initial transmit rate estimates $R^*_k$ of the packets to:

$$P^*_k = \frac{\ln(2)}{\sqrt{G_k}\,TB} \sum_{j=1}^{K} \frac{L_j}{\sqrt{G_j}}, k = 1, \ldots K$$

$$R^*_k = \frac{\sqrt{G_k}}{TB} \sum_{j=1}^{K} \frac{L_j}{\sqrt{G_j}}, k = 1, \ldots K$$

where:
$G_k$ is the gain-to-interference-plus-noise-ratio measure on communication link k,
$G_j$ is the gain-to-interference-plus-noise-ratio measure on communication link j,
T is the total available time for allocation of time-frequency resources,
B is the total available bandwidth,
K is the total number of communication links, and
$L_j$ is the number of bits in a packet on communication link j,
and configured to thereafter round the initial estimates $P^*_k$ and $R^*_k$ to nearest permissible values, where necessary.

5. The planner of claim 4, wherein:
the resource block selector is configured to select at least one further set (RBS2, $T_2$) of time-frequency resource blocks (RB) for the packets;
the transmit power and transmit rate estimator is configured to jointly estimate, within each selected further set (RBS2, $T_2$) of time-frequency resource blocks, transmit power and transmit rate of the packets as functions of determined gain-to-interference-plus-noise ratio measures, to at least approximately minimize expected transmitter energy consumption; and
an energy comparator is configured to compare expected transmitter energy consumptions for the selected sets (RBS1, RBS2, $T_1$, $T_2$) of time-frequency resource blocks and corresponding transmit powers and transmit rates, and to choose a selected set of time-frequency resource blocks and corresponding jointly estimated transmit powers and transmit rates that resulted in a lowest expected transmitter energy consumption for allocating to the packets.

6. A network node for a wireless Orthogonal Frequency Division Multiple Access (OFDMA) communication system, said network node comprising:
a transmitter configured to transmit packets on communication links to multiple receivers ($RX_1, \ldots, RX_K$); and
a time-frequency resource allocation planner, including:
a resource block selector configured to select a set (RBS) of time-frequency resource blocks (RB) for transmission of one packet for each communication link;
a communication link quality measure provider configured to determine a gain-to-interference-plus-noise ratio measure ($G_k$) for each communication link; and
a transmit power and transmit rate estimator configured to jointly estimate, within the selected set of time-frequency resource blocks, transmit power ($P_k$) and transmit rate ($R_k$) of the packets as functions of determined gain-to-interference-plus-noise ratio measures, to at least approximately minimize expected transmitter energy consumption;

wherein the transmit power and transmit rate estimator is configured to set initial transmit power estimates $P^*_k$ and initial transmit rate estimates $R^*_k$ of the packets to:

$$P^*_k = \frac{\ln(2)}{\sqrt{G_k}\, TB} \sum_{j=1}^{K} \frac{L_j}{\sqrt{G_j}}, k = 1, \ldots K$$

$$R^*_k = \frac{\sqrt{G_k}}{TB} \sum_{j=1}^{K} \frac{L_j}{\sqrt{G_j}}, k = 1, \ldots K$$

where:
- $G_k$ is the gain-to-interference-plus-noise-ratio measure on communication link k,
- $G_j$ is the gain-to-interference-plus-noise-ratio measure on communication link j,
- T is the total available time for allocation of time-frequency resources,
- B is the total available bandwidth,
- K is the total number of communication links, and
- $L_j$ is the number of bits in a packet on communication link j, and configured to thereafter round the initial estimates $P^*_k$ and $R^*_k$ to nearest permissible values, where necessary.

7. The network node of claim 6, wherein said network node is a base station.

8. The network node of claim 6, wherein said network node is a radio relay station.

* * * * *

UNITED STATES PATENT AND TRADEMARK OFFICE
CERTIFICATE OF CORRECTION

PATENT NO.         : 8,971,201 B2
APPLICATION NO.    : 13/695306
DATED              : March 3, 2015
INVENTOR(S)        : Larsson It is certified that error appears in the above-identified patent and that said Letters Patent is hereby corrected as shown below:

In the specification

In Column 3, Line 3, delete "interferenceplus" and insert -- interference-plus --, therefor.

In Column 5, Line 60, delete "gain-tointerference-" and insert -- gain-to-interference- --, therefor.

In Column 8, Lines 18-21, delete " $\dfrac{T_R B_R \sum_{k=}^{K} N_k}{B}$ " and insert -- $\dfrac{T_R B_R \sum_{k=1}^{K} N_k}{B}$ --, therefor.

In Column 9, Line 51, delete " $\ln(1+G_k P_A) \approx G_k P_k - (G_k P_k)^2/2 + \ldots$ " and insert -- $\ln(1+G_k P_k) \approx G_k P_k - (G_k P_k)^2/2 + \ldots$ --, therefor.

In Column 11, Line 53, delete "c$_t$." and insert -- C$_i$. --, therefor.

Signed and Sealed this
Sixth Day of October, 2015

Michelle K. Lee
*Director of the United States Patent and Trademark Office*